United States Patent [19]

Wardwell et al.

[11] 4,112,812
[45] Sep. 12, 1978

[54] HEAT-TREATED ARTICLE

[75] Inventors: Charles H. Wardwell; Norman L. Holcomb, both of South Dartmouth, Mass.

[73] Assignee: Research Engineering & Manufacturing, Inc., New Bedford, Mass.

[21] Appl. No.: 334,705

[22] Filed: Feb. 22, 1973

Related U.S. Application Data

[62] Division of Ser. No. 128,040, Mar. 25, 1971, Pat. No. 3,769,103.

[51] Int. Cl.² .................. F16B 25/00; F16B 33/06
[52] U.S. Cl. ............................ 85/46; 148/147
[58] Field of Search .............. 85/46, 41, 48, 1 C, 85/47; 151/22; 10/10 R; 408/226; 148/147

[56] References Cited

U.S. PATENT DOCUMENTS

| 1,909,476 | 5/1933 | Trotter | 85/41 |
| 2,215,930 | 9/1940 | Mahla | 85/46 X |
| 2,229,565 | 1/1941 | Hallowell, Jr. | 85/1 C |
| 2,352,982 | 7/1944 | Tomalis | 85/48 X |
| 3,195,156 | 7/1965 | Phipard | 85/47 X |
| 3,213,742 | 10/1965 | Kahn | 10/152 T |
| 3,344,817 | 6/1974 | Connard | 85/47 X |

Primary Examiner—Ramon S. Britts
Attorney, Agent, or Firm—Olson, Trexler, Wolters, Bushnell & Fosse, Ltd.

[57] ABSTRACT

An article is hardened or tempered in a localized zone. Where the article is a thread-forming device the zone is that part of its thread that does the thread-forming in the workpiece. The hardness of the remainder of the body of the article is left unchanged. The localized hardening is carried out by a method that includes high frequency induction heating only of the zone followed by quenching of the zone whereby the hardened zone is a skin of predetermined depth. A machine for making articles in accordance with the method comprises means for delivering the articles in succession to an induction heating element, a mechanism for advancing the articles through the heating element for progressive heating of the surface of the article in the localized zone to a predetermined depth, a quenching manifold for applying a spray of quenching liquid to the heated article, and means for removing the heated articles from the heating element and conveying them to the quenching manifold.

7 Claims, 17 Drawing Figures

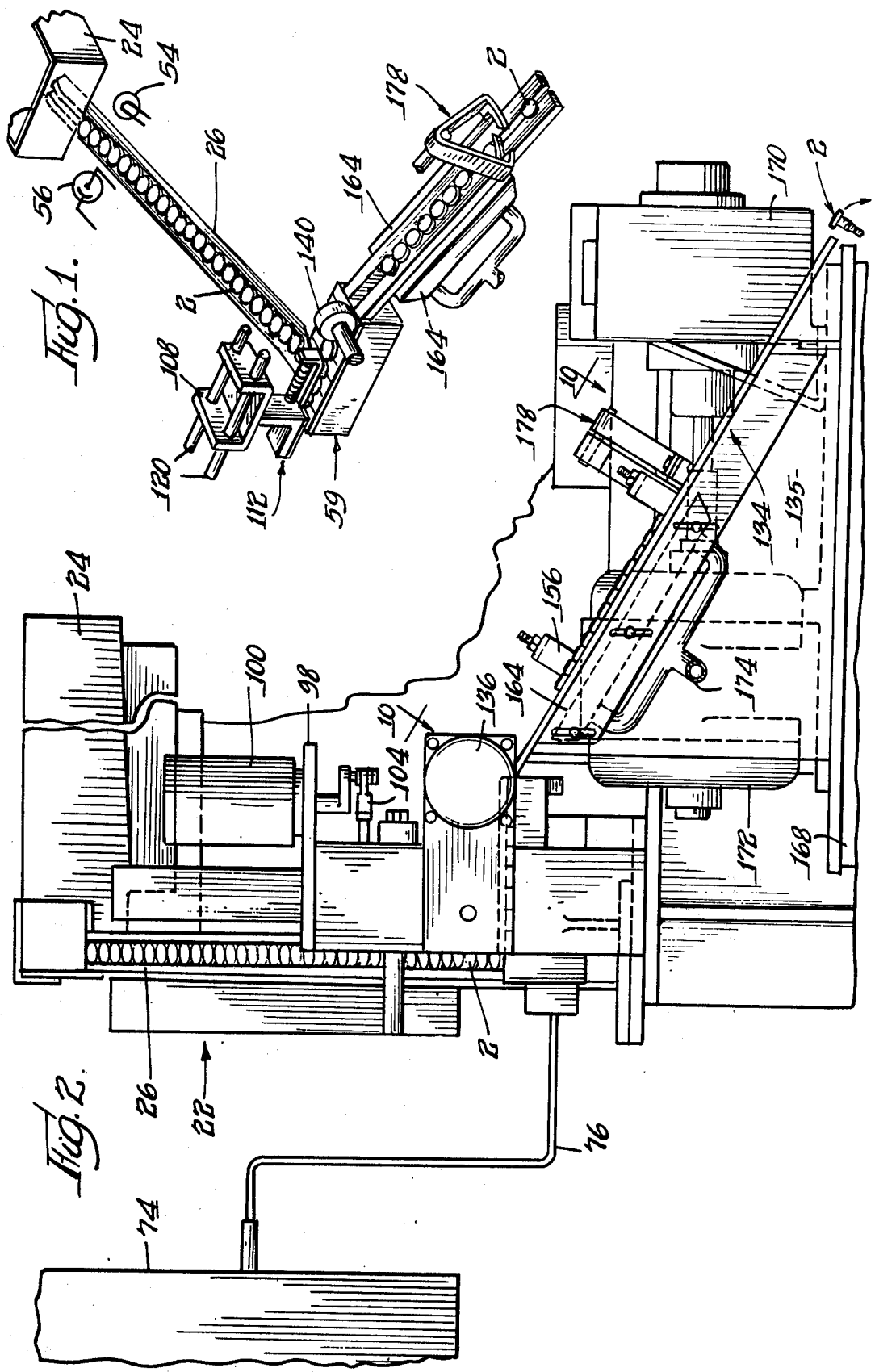

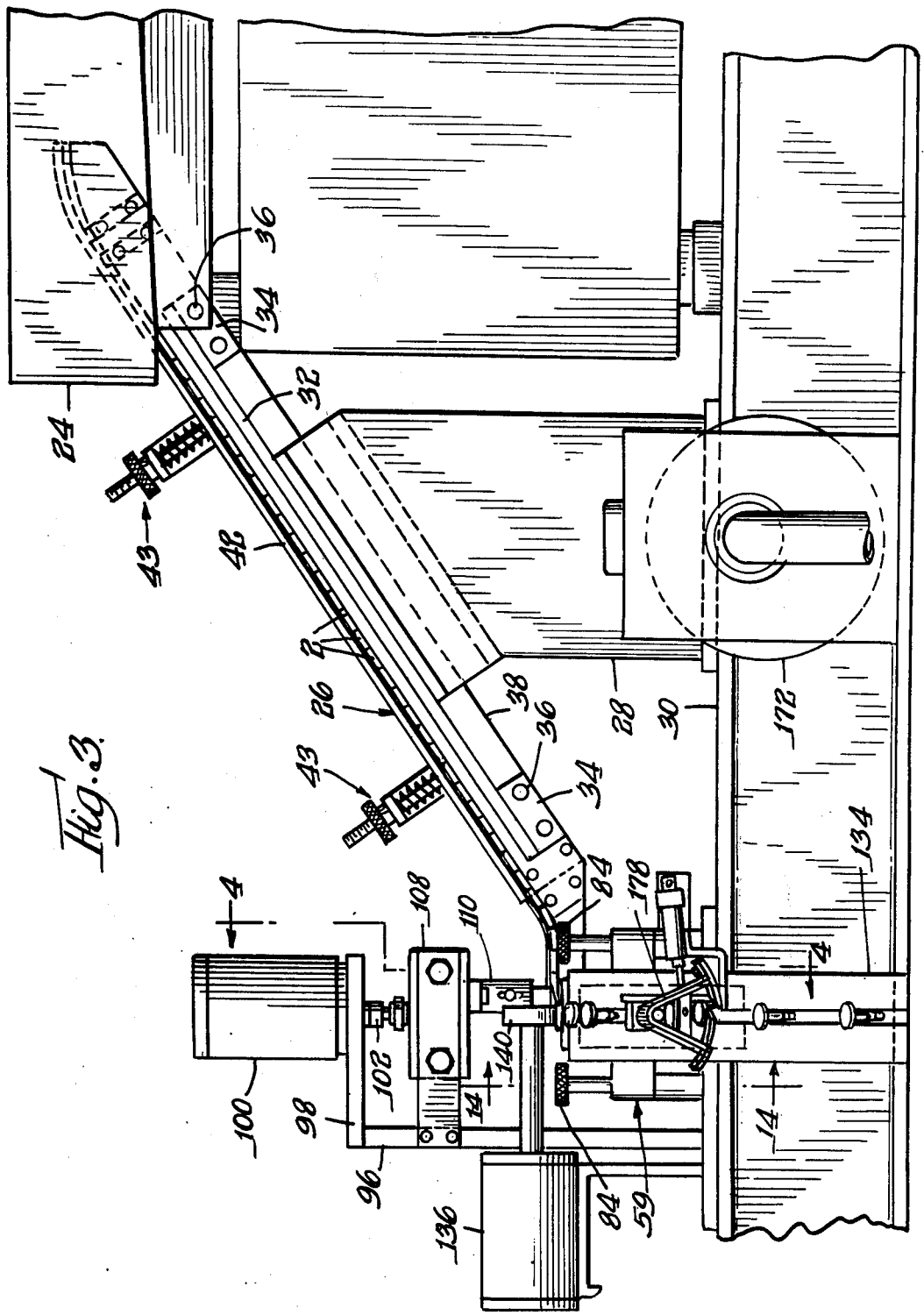

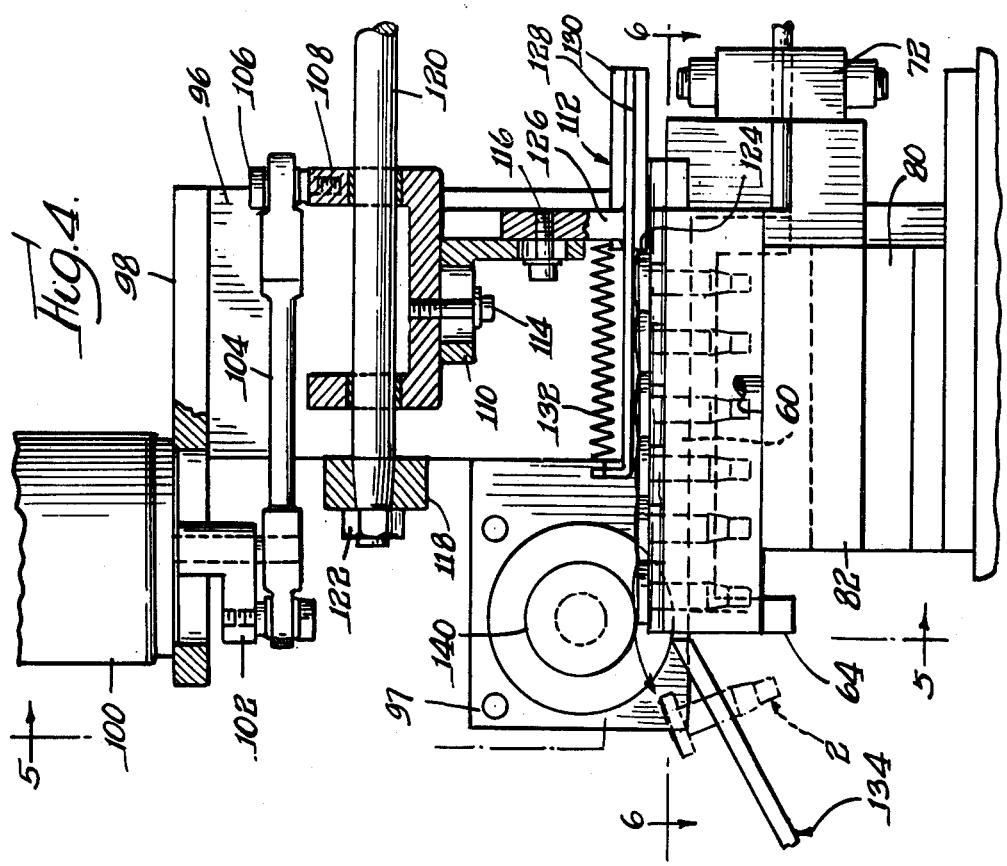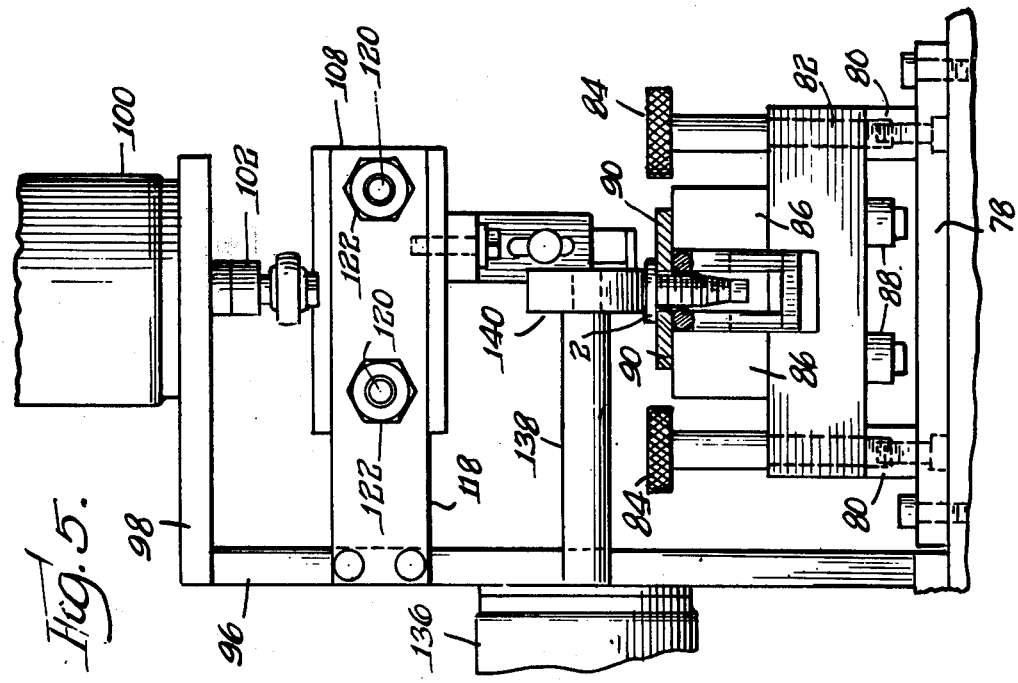

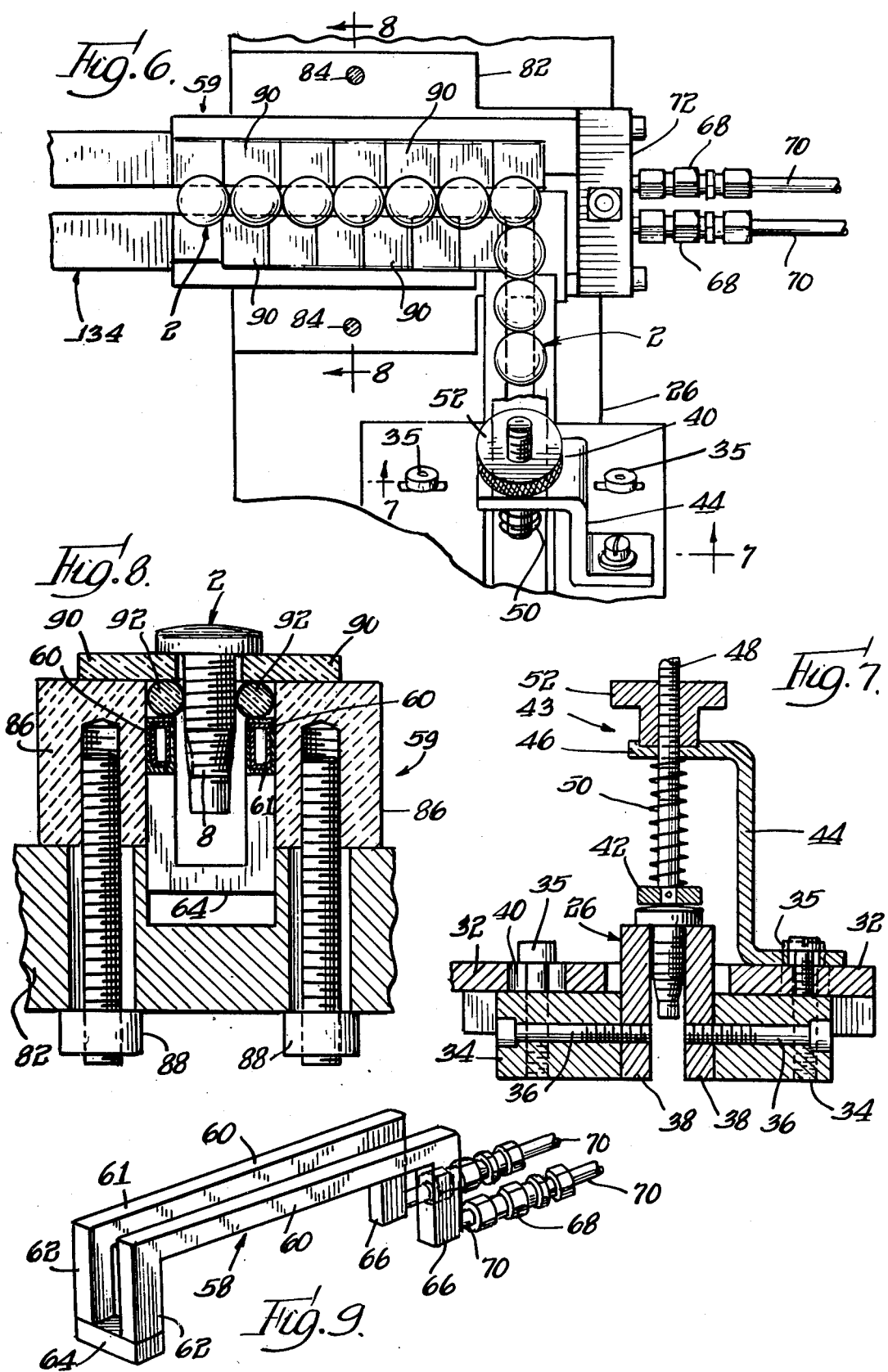

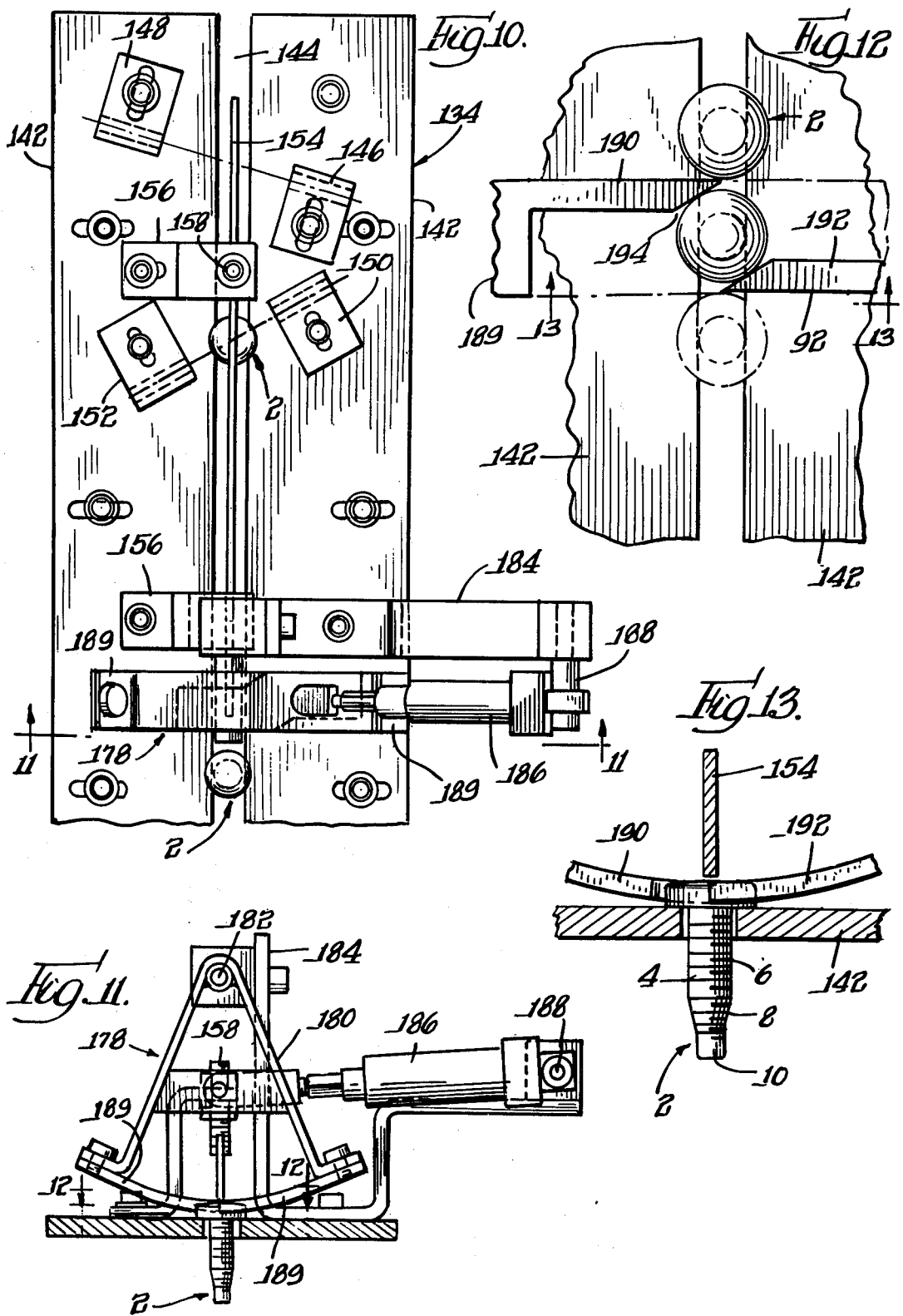

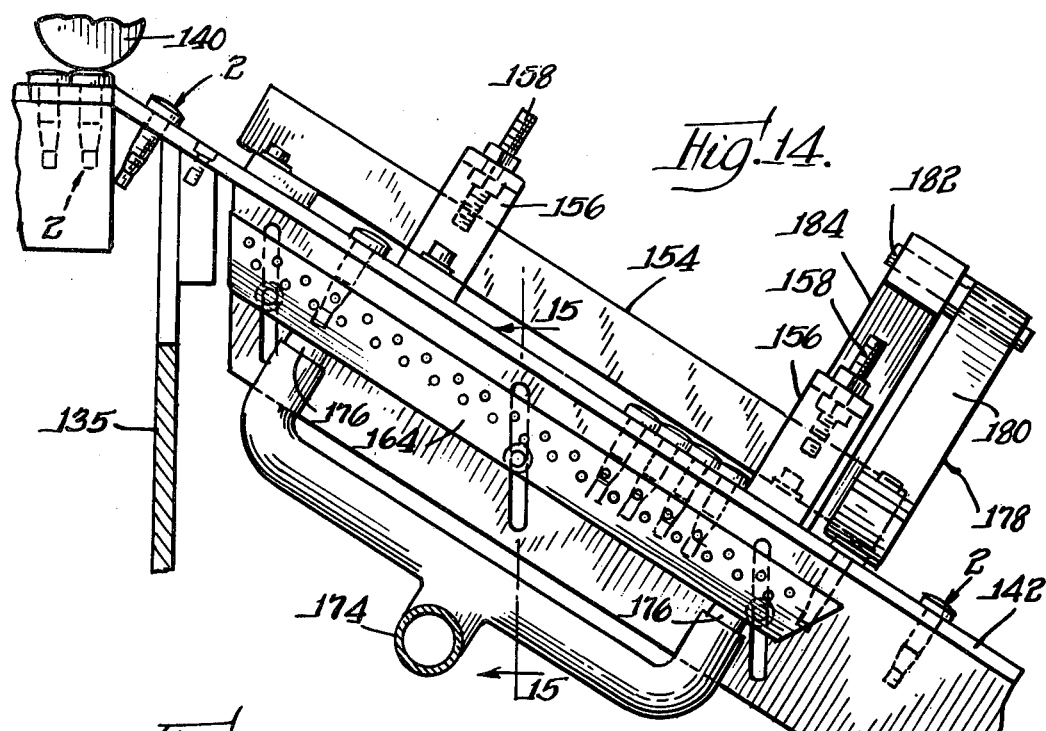
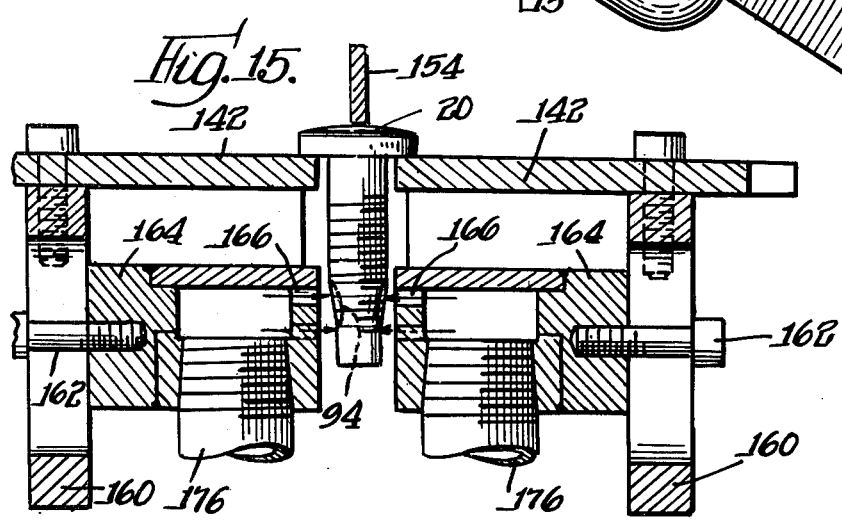
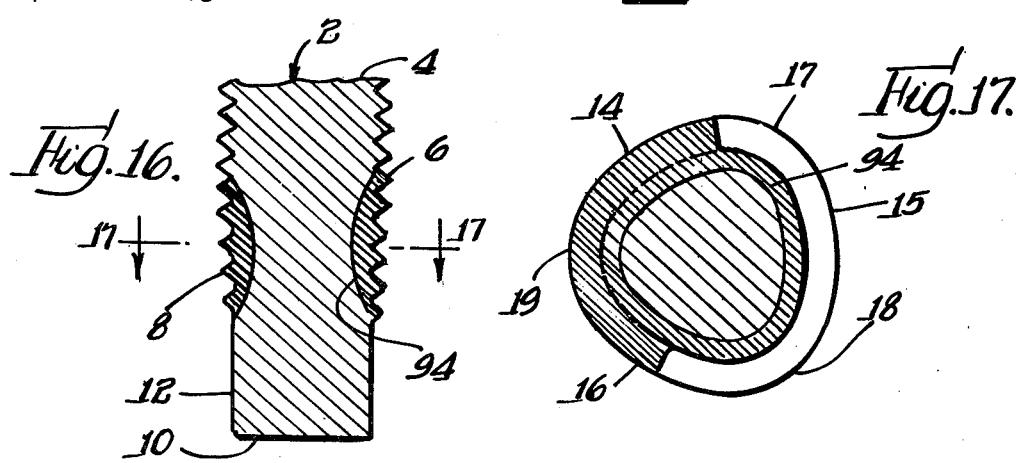

HEAT-TREATED ARTICLE

This is a division of application Ser. No. 128,040, filed Mar. 25, 1971, now U.S. Pat. No. 3,769,103.

BACKGROUND OF THE INVENTION

This invention relates to a selectively heat-treated article, such as a screw, threaded article, or the like and to a method and machine for making the same.

In the manufacture of thread-forming screws of hardenable metal, it is a common practice to case harden the screws so that the thread thereon will be effective to swage or cut a thread in the workpiece. Case hardening involves heat treating in a special atmosphere, usually one that is enriched in carbon. In accordance with case hardening techniques, the screw or other workpiece is heated through its entire body, and during the heating the carbon penetrates a predetermined distance into the body. Upon quenching in water or oil the carburized skin forms a hardened shell or case. A mild temper for stress relief may follow the quenching operation.

It is also known to harden and temper thread-forming devices (e.g. self-tapping screws, taps) by simply hardening in an atmosphere that contains sufficient carbon to prevent reduction of the carbon content of the surface of the thread. However, the process still involves a heating of the entire device to the requisite treatment temperature.

Conventional hardening processes of the foregoing type, and others of the prior art, do not always produce a thread-swaging screw of desired properties. The hardening may be satisfactory so far as producing a thread that is able to withstand thread-forming pressure in the workpiece; however, it often results in a screw that has undesirable structure and/or composition for certain purposes. In this regard it should be noted that in many thread-swaging fasteners, only a portion of the thread actually is used to form the thread while the remainder of the thread is for holding the screw and workpiece assembled. Thus, where the screw, when assembled with the workpiece, is subjected to dynamic stresses or even high static stresses, the surface of the screw may be subject to cracking due to the inherent brittleness. This may result in spreading of the crack through the body of the fastener and ultimate failure thereof.

OBJECTS AND SUMMARY OF THE INVENTION

It is an object of this invention to provide a threaded article, such as a self-tapping screw, in which the thread is locally hardened at the work-entering portion of the thread (i.e. the part of the thread that forms a thread in the workpiece) but wherein the remainder of the screw is left at a hardness to which it has been previously heat-treated and which is ordinarily the hardness that is best adapted to the use for which the screw is intended. The zone of hardness is controlled or limited to a predetermined depth necessary to provide the work-entering portion of the thread with such hardness as may be necessary to withstand the thread-forming pressure from the workpiece. The thread-forming portion or zone need not have a knife edge as in a thread cutting device.

A further object of this invention is to provide a thread-swaging screw in which the depth of hardness of the localized zone is reasonably consistent throughout the circumference of the screw at such zone. The thread-swaging screw may be of various known types; however, a type having an arcuate polygonal cross-section with arcuate sides and arcuate intermediate thread-swaging lobes is a particularly suitable form of this invention.

It is also an important object of this invention to provide a method of making a thread-forming article that comprises locally heating a thread-forming zone of the article to a predetermined depth that includes the thread thereat and then quenching the heated zone to harden such zone. The core of the article that is surrounded by the hardened zone as well as the remainder of article remote from the zone is left substantially unchanged as to hardness. The method is particularly suitable for thread-swaging screws of the type stated, but the principles are applicable to other kinds of thread-forming devices (e.g. taps, locking screws or bolts) or to other types of screws wherein the hardening or tempering of only a portion of the article is desired.

It is a further object of this invention to provide a method of the type stated in which the localized heating in the aforesaid zone is carried out by an inductive heater that induces at said zone a high frequency alternating current field. The induced field results in a "skin effect" heating to a predetermined depth that may be controlled so as to be no greater than is actually needed. The process is carried out in ordinary ambient air.

A further object of this invention is to provide a machine for carrying out the aforesaid method to produce the zone hardened articles on a continuous flow, mass-production basis, or to temper articles on a mass-flow basis.

A more specific object of this invention is to provide a machine that comprises an induction heating element for heating articles only in a desired localized zone, mechanism for feeding the articles automatically to said induction heating element, mechanism for automatically removing the heated articles from the heating element, and a quenching manifold for spraying a quenching liquid, such as water or oil, onto the heated zone while the latter is still sufficiently hot to produce the desired hardness. The machine is principally intended for zone hardening of screws, but other elongated articles might also be zone hardened by the machine.

In accordance with the foregoing objects, articles such as thread-forming screws, are supplied from a hopper to a raceway in which the screws are fed, one at a time, by a pusher mechanism onto a support so that the shanks of the screws are disposed between and perpendicular to the general plane defined by parallel bars that form part of a single turn induction heater. The height of the bars and their positions relative to the shanks of the screws are such that the bars induce a current field locally into the selected zone of each shank peripherally therearound. In the normal operation of the machine, a group of screws is positioned in abutting parallel relation between the bars so that the screws are progressively heated as they are pushed through the path between the bars in a step-by-step manner by the pusher. As a screw is fed from the raceway and into the space between the bars to commence heating of that screw, another screw that has now been moved completely through the path between the bars (and is now fully heated) is discharged from between the bars by a feed roller. The feed roller causes the heated screw to become deposited on a second raceway down which the heated screw immediately passes to the quenching manifold that quenches the zone uniformly with a high pressure spray. For tempering the quenching is not used. An escapement mechanism is interposed in the second raceway adjacent to the discharge end of the quenching manifold to allow a quenched screw to be released for further movement down the raceway to a receptacle as soon as a heated screw is discharged from the induction heater and approaches the quenching manifold.

BRIEF DESCRIPTION OF THE FIGURES

In the drawings:

FIG. 1 is a fragmentary perspective view showing portions of a machine constructed in accordance with and embodying the present invention;

FIG. 2 is a fragmentary and elevational view of the machine;

FIG. 3 is a front elevational view thereof;

FIG. 4 is an enlarged fragmentary sectional view taken along line 4—4 of FIG. 3;

FIGS. 5 and 6 are fragmentary sectional views taken along lines 5—5 and 6—6 respectively of FIG. 4;

FIGS. 7 and 8 are fragmentary sectional views taken along lines 7—7 and 8—8 respectively of FIG. 6;

FIG. 9 is a perspective view of the induction heating element that forms part of the present invention;

FIG. 10 is a fragmentary plan view as seen from line 10—10 of FIG. 2;

FIG. 11 is a fragmentary sectional view taken along line 11—11 of FIG. 10;

FIG. 12 is an enlarged fragmentary sectional view taken approximately along line 12—12 of FIG. 11;

FIG. 13 is a fragmentary sectional view taken along line 13—13 of FIG. 12;

FIG. 14 is an enlarged fragmentary sectional view taken approximately along line 14—14 of FIG. 3;

FIG. 15 is an enlarged fragmentary sectional view taken along line 15—15 of FIG. 14;

FIG. 16 is a fragmentary longitudinal sectional view of a thread-forming screw constructed in accordance with and produced by the method of the present invention; and FIG. 17 is a sectional view taken along line 17—17 of FIG. 16.

DETAILED DESCRIPTION

Referring now in more detail to the drawing and in particular to FIGS. 15-17, there is shown a self-tapping screw of one type with which the present invention is concerned. The screw 2 includes a shank 4 having a helical thread 6 thereon. The thread 6 includes a thread-swaging portion 8 at which the crest of the thread is of progressively decreasing diameter toward the work-entering end 10 of the screw. In the form of screw shown in FIG. 16, there is a relatively long unthreaded tapered portion 12 between the work-entering end 10 and the thread-swaging portion or zone 8; however, the screw 2 may be of a type having its thread extending to the work-entering end 10 or almost thereto. As seen in FIG. 17, the cross-section of the thread defines a regular polygon with an odd number of sides. This cross-sectional configuration may be present throughout the full length of the thread 6 or it may simply be in the thread-swaging zone 8 and such lead section 12 as may be present. In the specific form shown, the cross-section of the thread defines three arcuate sides 14, 15, 16 with arcuate intermediate thread-swaging lobes 17, 18, 19. The screw 2 also has a head 20 that is larger in diameter than the adjacent part of the shank 4.

Referring now to FIGS. 1-3, 6 and 7, the machine, generally designated at 22, comprises a hopper 24 for holding a supply of screws 2. The hopper includes a feeding mechanism of known type for feeding the screws one by one into a downwardly inclined raceway 26. The raceway 26 is mounted at the desired angle of inclination on an upstanding support 28 which is, in turn, mounted on a suitable frame portion 30 of the machine. The raceway support 28 includes side members 32, 32 that are bolted to end blocks 34, 34. Passing through the end blocks 34, 34 are bolts 36, 36 for threaded engagement with rails 38, 38. When the screws 2 slide down the raceway 26, the screw head 20 rests on the tops of the rails 38, 38 and the screw shank 4 projects into the gap between the rails 38, 38. To provide for adjustable spacings of the rails 38, 38 the bolts 35 are disposed in elongated slots 40, one such slot being shown in FIG. 7.

Also in FIG. 7, a hold down bar 42 is disposed above the rails 38, 38 and is adjustably positioned so that the heads of the screws when on the rails 38, 38 keep the screws perpendicular to the raceway. The mounting for the hold down bar 42 includes two assemblies 43, 43 each having a bracket 44 that is bolted to one of the side members 32. At its upper end the bracket has a flange 46 for receiving the threaded stud 48, the lower end of which is secured to the hold down bar 42. A coil spring 50 encircles the stud 48 and is interposed between the flange 46 and the hold down bar 42, and above the flange 46 a hand screw 52 is threaded onto the stud 48. Thus, by turning the screws 52, 52, the position of the hold down bar 42 may be adjusted relative to the rails 38, 38.

In the normal operation of the machine, the feeding mechanism within the hopper 24 should maintain a supply of screws 2 in the raceway 26. To make sure that the raceway is kept supplied, there is shown diagramatically in FIG. 1, a light source 54 and a photocell 56 that may be used to control the motor that operates the feeder within the hopper 24. When the light beam ceases to be interrupted by screws 2, the feeder begins to operate to discharge screws from the hopper 24 into the raceway 26.

At the bottom of the raceway 26 the machine has an induction heating element 58 and related structure 59 for mounting the element in place and for providing a slide-support for the screws that pass through the element 58. The heating element is in the nature of a one turn induction coil. As best seen in FIG. 9, the element 58 is a tubular copper member of rectangular cross-sections (see FIG. 8) having spaced parallel bars 60, 60, the forward ends of which have downturned legs 62, 62 that are cross connected by an end section 64. At its opposite ends there are additional depending legs 66, 66 which are electrically and mechanically connected through fittings 68, 68 to electrical tubular copper leads 70, 70. Intermediate the fittings 68, 68 and the legs 66, 66 the leads 70, 70 may be clamped in a suitable manifold 72 (FIGS. 4 and 6). As best seen in FIG. 8, the element 58 may be coated with glass or ceramic 61 for insulation purposes. Current may be supplied to the leads 70, 70 from an induction heating generator 74 (FIG. 2) through a pair of tubular supply lines 76 that are respectively connected to the leads 70, 70. In addition to electric current, cooling water may be circulated from a suitable source of supply through the lines 76 and the leads 70 to the coil 58 to maintain the coil at the desired operating temperature. The electric current supply to the coil is preferably of a radio frequency and may be of the order of 400KHz.

Referring more particularly to FIGS. 4, 5, 6 and 8 it will be seen that the structure 59 includes a base plate 78 that is bolted or otherwise rigidly secured to a frame portion 80 of the machine. Bolted to the upper surface of the base plate 78 are spacer blocks 80 that support an upper block 82. The upper block 82 is secured to the spacer blocks 80 by hand screws 84, 84. On top of the block 82 are dielectric members 86, 86 which are disposed on opposite sides of the coil bars 60, 60. The members 86, 86 may be secured to the block 82 by fiber nuts and studs 88. On top of the members 86, 86 and secured thereto in any suitable manner are ceramic plates 90 that provide a relatively low friction surface for engagement by the heads of the screws 2 as the screws pass between the coil bars 60, 60. Interposed between the upper surfaces of the bars 60, 60 and the ceramic plates 90 are insulating glass spacer rods 92, 92.

As each screw 2 leaves the lower end of the raceway 26 and comes to rest on the ceramic plates 90, 90, as shown in FIG. 6, the screws will progressively pass between the bars 60, 60 to become inductively heated. The relative positions of the bars 60, 60 with respect to the thread-swaging zone 8 of the screw 2 and the sides of the bars 60, 60 should be such that the bars approximately span the axial length of the thread-swaging zone 8 and with the thread-swaging zone 8 being closely adjacent to the bars 60, 60 to effect maximum inductive heating and close control over the depth of heating. Accordingly, when the screws are advanced in the space between the bars 60, 60, the high frequency electric current will be induced at the zone 8 through a predetermined depth such as indicated by the line 94 in FIGS. 16 and 17. Since the high frequency alternating current produces a "skin effect", the heating is confined to the localized area of the thread-swaging zone 8 leaving substantially unheated the core of the screw that surrounds the heated zone and the parts of the screw axially remote therefrom. The heating is progressive and may be readily controlled so that just the proper amount of depth of heating in the localized zones is attained. The depth and length of the heated zone need only be that sufficient to withstand the thread-forming pressures to which the screws are intended to be subjected during use.

The mechanism for feeding the screws between the coil bars 60, 60 will now be described, and for this purpose reference should be had to FIGS. 4 and 5. Suitably secured to the frame of the machine is an upstanding motor bracket 96 having a top plate 98 upon which is mounted a variable speed feeder motor 100. The top plate 98 is apertured for receiving the motor shaft which has thereon a crank 102 that is journalled at one end of a connecting rod 104. The other end of the connecting rod 104 is journalled on a pin 106 that is secured to a yoke 108. The yoke 108 carries with it a depending angle bracket 110 which, in turn, carries a pusher 112. The angle bracket 110 is adjustably secured to the yoke 108 by bolt 114 while the pusher 112 is adjustably secured to the angle bracket 110 by bolt 116. This allows for adjustments for various sizes of screws being processed. The pusher 112 reciprocates and has a stroke as determined by the throw of the crank 102. For purposes of guiding the yoke 108 and thus the pusher 112 in the path of reciprocation, a flange 118 is bolted to the motor bracket 96 for rigidly supporting spaced parallel guide pins 120, 120. Nuts 122, 122 retain the guide pins in place. For each rotation of the crank 102, the edge 124 of the pusher 112 engages the bottommost screw in the raceway 26 and pushes it into the space between the coil bars 60, 60 to commence the zone heating of the screw.

An anti-jam feature of the pusher 112 is also provided. For this purpose the vertical arm portion 126 of the pusher 112 is rigidly secured to a member 128 that is slidable within the horizontal portion 130 of the pusher 112. A spring 132 is operatively interposed between the leading end of the slidable member 128 and the vertical arm portion 126. This biases the arm portion 126 into abutting relationship with the portion 130. However, if the leading edge 124 meets excessive resistance due to jamming of the machine, the member 128 will slide relative to the portion 130 causing the spring 132 to expand. The member 126 and the member 128 will then be able to move to the left (FIG. 4) relative to the member 130 to take up the stroke of the mechanism.

As will best be seen from FIGS. 4 and 6, a plurality of screws 2 with the heads thereof in abutting relationship are supported on the ceramic plates 90 for step-by-step movement between the bars 60 so that each screw becomes locally heated a sufficient amount as it reaches the left hand end (FIGS. 4 and 6) of the heater. Accordingly, the left hand end of the heater is suitably provided with a device for removing the heated screw and delivering the screw to a downwardly inclined raceway 134 for movement to a water quenching device, which forms part of the machine. As shown, the upper end of the raceway 134 is adjacent to the discharge end of the induction heater. This feed off mechanism comprises a motor 136 that is mounted on a bracket 97 and includes a shaft 138 that has a feed off roller 140 overlying the ceramic plate 40 at the end of the coil. The periphery of the feed roller 140 engages the fully heated screw at the head thereof each time the pusher 112 feeds a screw from the raceway 26 into the space between the bars 60, 60.

Referring more particularly to FIG. 10, the raceway 134 comprises opposed plates 142, 142 on which the head of the screw slides, and the plates define a gap 144 through which the screw shank projects. The raceway plates 142, 142 may be mounted on the frame of the machine by a support structure 135. Mounted on the plates 142, 142 is a first electric eye control mechanism comprising a light transmitting source 146 and a photocell 148 that actuates a time delay safety mechanism. If a screw does not, within a specified period of time, interrupt the light beam, the machine is shut off. This may occur, for instance, should the machine jam. Further down the raceway 134 is a second photocell control arrangement comprising a light transmitting source 150 and a photocell 152 for the purpose of operating an escapement mechanism, to be hereinafter described.

A hold down member 154 is provided to maintain the screws 2 in the raceway in the proper positions, that is generally perpendicular to the plates 142, 142. The hold down member 154 includes brackets 156, 156 that are mounted on one of the plates 142 and contain adjusting screws 158 by which the height of the member 154 relative to the raceway 134 may be adjusted for different sizes of screws.

Mounted on and depending from the raceway 134 are members 160, 160 having secured thereto as by bolts 162 a pair of opposed quenching manifolds 164, 164. Formed in the quenching manifolds 164, 164 are orifices 166, which are disposed along a substantial length of the raceway 134 and provide a means by which quenching liquid, such as water or oil, may be applied to the heated screws in the localized zone at which the screws are heated in the induction heating element 58. Accordingly, the quenching manifolds 164, 164 should be mounted at distances below the raceway plates 142, 142 such that the orifices 166 are approximately in alignment with the locally heated thread-swaging zone 8, as seen in FIG. 15. Thus, the vertical positions and the spacing of the quenching manifolds are adjustable.

Water for the quenching manifold may be stored in a suitable reservoir or tank 168 (FIG. 2). A pump 170, driven by electric motor 172, draws water from the tank 168 and delivers the water under pressure to manifold piping 174 which connects with pipe sections 176, 176 (FIG. 15) for delivery of the fluid to the respective manifolds 164, 164. The quenching water that impinges upon the screws drops downwardly between the manifolds and may be suitably collected for recirculation to the supply tank 168.

Since the heated screws 2 are rapidly fed from the heater 58 by the roller 140 and the screws quickly slide down the raceway 134 to the quenching manifolds 164, 164 the initial quenching is quite rapid, which gives desired hardness properties to the localized zone. Further cooling of the screws 2 takes place at the lower portions of the quenching manifolds 164 where, as shown in FIG. 10, several screws 2 may be positioned, the lowermost of which is in abutment with an escapement mechanism 178.

The escapement mechanism 178 is of a type that is capable of operating faster than the normal machine feed and independently thereof. The escapement mechanism 178 includes a sector-shaped member 180 that is journalled for rocking movement on a pin 182, the pin 182 being carried by an escapement mounting bracket 184 that is bolted to one of the raceway plates 134. A pneumatic piston and cylinder assembly 186 is pivotally connected to the member 180 and also pivotally connected to the bracket 184, the connection to the latter being at pivot pin 188. The piston of the assembly 186 operates to rock the escapement member 180 back and forth through one cycle of operation when the stack or group of screws fills the raceway 134 up to the beam from the light source 150. This interruption must be for a predetermined period of time so as to prevent actuation of the escapement when a screw is fed from the heating coil and momentarily breaks the beam from the light source 150. Thus, the photocell 152 controls the actuation of the piston and cylinder assembly 186. The arrangement of suitable valves for the assembly 186 and the manner of operating them by the photocell 152 can be carried out in accordance with known techniques.

Arcuate plates 189, 189 are bolted to the free ends of the sector member 180 and present portions 190, 192 that define an opening 194 (FIG. 12). When the plate 189 swings clockwise about the pivot pin 182, reference being to FIG. 11 a screw 2 will drop into the opening 194 and will be held therein between the portions 190, 192. However, when the plate 189 then swings counterclockwise past dead center, the offset portion 192 will be out of the way of the screw in the opening 194 so that the screw will slide freely down the raceway 134 to a receptacle below. The next screw in line abuts the up raceway side of the member 190. When the plate 189 moves back counterclockwise past dead center, the aforesaid next screw will become lodged in the opening 194.

The screws 2 thus treated are now locally hardened uniformly in an annular zone which is of a predetermined depth from the periphery of the swaging portion 8 of the screw thread. Such depth of hardness is indicated by the line 94 in FIGS. 16 and 17. This depth may be only a minor fractional part of the nominal diameter of the screw threads and need encompass only a few turns of the thread, namely those that do the thread-swaging in the work. The core of the screw surrounded by the locally hardened zone and the part of the screw axially of the hardened zone is of optimum hardness for intended use. Those regions are essentially unchanged as to composition or grain structure as a result of the process of this invention.

The invention is claimed as follows:

1. An article of manufacture having a shank with a work-entering end, a first zone over a portion of the length thereof, and a second zone over another portion of the length thereof, said zones being peripherally threaded, the thread at said first zone including means for producing a thread in a workpiece and the thread at said second zone constituting a means for engaging the thread that is produced in the workpiece, said first zone being intermediate said work-entering end and said second zone, the first zone being locally heat-treated at its peripheral region to a depth that includes at least a portion of the thread depth thereat but leaves a core of the shank at both zones and the thread on said second zone of a lesser hardness, the locally heat-treated part of said first zone being of substantially the same composition as the core surrounded thereby.

2. An article according to claim 1 in which said locally heat-treated part is of a depth that is a minor fractional part of the transverse dimension of the shank at said first zone.

3. A threaded fastener having a shank with a thread thereon, said thread having a first zone extending over a portion of the length of said shank and including lobular means for swaging a thread in a workpiece, said thread also having a second zone extending over another portion of said shank for engagement with the thread that is swaged in the workpiece by the thread in the first zone to hold the fastener assembled with the workpiece, at least the lobular means of the thread in the first zone being inductively hardened to a hardness that is greater than the hardness of the thread in the second zone and a core of the shank that is surrounded by the thread in both zones.

4. A threaded article according to claim 3 in which the thread in the two zones is of substantially the same composition.

5. A threaded fastener according to claim 4 in which at least said first zone has a cross-section of arcuate polygonal configuration having arcuate sides with arcuate intermediate lobes constituting said lobular means for swaging said thread.

6. A threaded fastener according to claim 5 in which the shank has a work-entering end, and said crest of the thread in said first zone tapers toward said work-entering end.

7. A self-tapping fastener having a shank, said shank having a first zone extending over a first portion of the length of said shank and with said first zone having a thread portion for swaging a thread in a workpiece, said shank also having a second zone extending over a second portion of the length of said shank and said second zone having another thread portion for engagement with the thread that is swaged in the workpiece by the thread in the first zone to hold the fastener assembled with the workpiece, the thread in at least said first zone being of arcuate polygonal cross section with an odd number of thread-swaging lobes circumferentially separated by intervening arcuate sides, said shank having a work-entering end, said first zone being axially intermediate said work-entering end and said second zone, the crest of the thread in said first zone tapering toward said work-entering end, the first and second zones being of substantially the same composition, said second zone extending radially inwardly from the thread crest therein the full radial dimension of said shank in said second portion thereof, said first zone extending radially inwardly from the thread crest therein to a predetermined depth such that said first zone is of annular configuration and surrounds a core of said shank over said first portion thereof, said second zone and said core having substantially the same hardness, and said first zone at least at the lobes of the tapering crest therein having been inductively hardened to provide a hardness that is greater than that of said core and said second zone.

* * * * *